A.J. Heavner. Churn.

No. 73327

PATENTED JAN 14 1868

Witnesses.

Inventor:

United States Patent Office.

ANDREW J. HEAVNER, OF TIME, ILLINOIS.

Letters Patent No. 73,327, dated January 14, 1868.

IMPROVEMENT IN CHURNS.

The Schedule referred to in these Letters Patent and making part of the same.

TO ALL WHOM IT MAY CONCERN:

Be it known that I, ANDREW J. HEAVNER, of Time, in the county of Pike, and State of Illinois, have invented a new and useful Improvement in Churns; and I do hereby declare that the following is a full, clear, and exact description thereof, which will enable those skilled in the art to make and use the same, reference being had to the accompanying drawings, forming part of this specification.

This invention relates to an improvement in churns, and consists in a dasher constructed in two parts, one part working within the other, the two dashers being operated by two cranks working synchronously. In the accompanying drawings—

Figure 1:
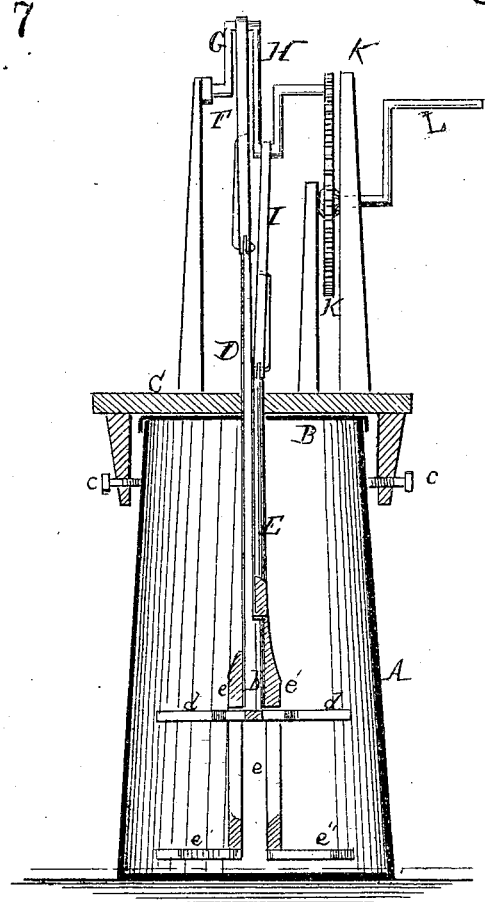
Figure 2:
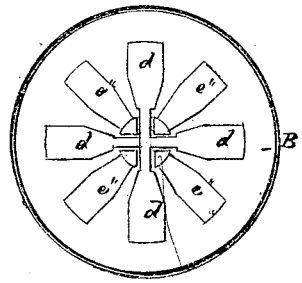

Figure 1 is a vertical section of my improved churn, and
Figure 2 is a bottom view of dasher and top of churn.
Similar letters of reference indicate corresponding parts.

A is the churn; B the top thereof, covered by the stand C, and secured by the set-screws $c\ c$. D is a dasher, provided with four paddles, $d$, arranged in the form of an equal-armed cross, and working in the slot $e$ and throat $e'$ of dasher E, provided with the four paddles $e''$, which alternate with the paddles $d$. The rotary motion of crank G imparts a vertical reciprocating motion to the dasher D through connecting-rod F, and crank H imparts a similar alternate motion to dasher E through connecting-rod I, the two cranks, G and H, being in effect a double crank, operating the dashers synchronously. The cranks may be operated by the wheel and pinion K $k$ and crank L, or any other suitable means.

I do not claim the double crank nor yet a double dasher; but

I claim as new, and desire to secure by Letters Patent—

1. The double dasher, consisting of the parts D E, constructed and arranged substantially as described, to work one within and through the other, as specified.

2. I claim the double dasher, consisting of the parts D E, operated by the double crank G H, through the medium of the connecting-rods F I, substantially as described and specified.

ANDREW J. HEAVNER.

Witnesses:
   G. W. PULSE,
   ANDREW RABLE.